US006223587B1

(12) United States Patent
Chiocca

(10) Patent No.: US 6,223,587 B1
(45) Date of Patent: May 1, 2001

(54) DEVICE AND METHOD FOR PERMANENTLY CONTROLLING THE TIGHTNESS OF CLOSING LIDS OF CONTAINERS FOR RADIOACTIVE MATERIALS

(75) Inventor: René Chiocca, Paris (FR)

(73) Assignee: Transnucleaire, Paris (FR)

( * ) Notice: Subject to any disclaimer, the term of this patent is extended or adjusted under 35 U.S.C. 154(b) by 0 days.

(21) Appl. No.: 09/463,223

(22) PCT Filed: Jul. 20, 1998

(86) PCT No.: PCT/FR98/01578

§ 371 Date: Feb. 23, 2000

§ 102(e) Date: Feb. 23, 2000

(87) PCT Pub. No.: WO99/05686

PCT Pub. Date: Feb. 4, 1999

(30) Foreign Application Priority Data

Jul. 24, 1997 (FR) .................................................. 97 09675

(51) Int. Cl.[7] ................................ G01M 3/04; G21F 5/00

(52) U.S. Cl. ............................ 73/49.6; 73/49.3; 73/49.8; 250/506.1; 250/507.1; 376/272; 376/250

(58) Field of Search ................................. 173/49.3, 49.6, 173/49.8; 250/506.1, 507.1; 376/272, 350, 205

(56) References Cited

U.S. PATENT DOCUMENTS

| | | | | |
|---|---|---|---|---|
| 4,274,007 | * | 6/1981 | Baatz et al. | 250/506.1 |
| 4,445,042 | * | 4/1984 | Baatz et al. | 250/506.1 |
| 4,447,733 | * | 5/1984 | Baatz et al. | 250/506.1 |
| 4,983,352 | * | 1/1991 | Efferding | 73/49.3 |
| 5,182,076 | * | 1/1993 | de Seroux et al. | 73/37 |

FOREIGN PATENT DOCUMENTS

| | | | |
|---|---|---|---|
| 2166680 | * | 5/1986 | (GB) . |
| 2265675 | * | 6/1993 | (GB) . |
| 57113341 | * | 7/1982 | (JP) . |
| 820193028 | * | 5/1984 | (JP) . |

* cited by examiner

*Primary Examiner*—Hezron Williams
*Assistant Examiner*—Michael Cygan
(74) *Attorney, Agent, or Firm*—Oblon, Spivak, McClelland, Maier & Neustadt, P.C.

(57) ABSTRACT

Device for checking the tightness of covers on a heavy metal container for transport and/or storage of radioactive materials, the said container comprising a cavity for nuclear materials delimited by a thick cylindrical shell closed at one end by means of a bottom fixed so that it is leaktight, and at the other end by at least two thick removable superposed covers, characterized in that the said covers are in contact with a shoulder formed in the shell, through flanges fitted with at least two concentric seals, that at least two ducts pass through the shell at each cover, leading through a first inspection orifice to the outside surface of the shell close to the cover in an accessible location, and through a second orifice, one into the space between the cover concentric seals, and the other into the space between the said cover, the shell and the immediately superposed cover, each inspection orifice optionally being connected to a tightness measurement and inspection circuit.

23 Claims, 2 Drawing Sheets

DEVICE AND METHOD FOR PERMANENTLY CONTROLLING THE TIGHTNESS OF CLOSING LIDS OF CONTAINERS FOR RADIOACTIVE MATERIALS

BACKGROUND OF THE INVENTION

1. Field of the Invention

This invention relates to a device and a process for checking the tightness of the covers (generally several) stacked on each other to close the cavity of a radioactive material transport or storage container, for example for irradiated fuels or vitrified residues from reprocessing of these fuels, the said device being used to check the tightness of each of the covers as they are closed in turn, and also subsequently after the container is fully closed, during its life while it is full, during its transport or storage.

2. Discussion of the Background

Radioactive materials, and particularly irradiated nuclear fuel assemblies or residues vitrified from reprocessing, are generally transported and/or stored in heavy thick walled (from a few cm to several tens of cm) containers (also called packagings) with a cylindrical shape and made with one or several layers, mainly based on forged or cast or rolled steel (possibly combined with lead), or based on cast iron which in particular provides functions of mechanical strength (resistance to severe shocks, for example if dropped), radiation shielding and heat transfer These containers normally include a cylindrical shell closed at one end by a bottom attached in a leakproof manner (for example by welding).

The cavity thus formed, in which the radioactive material is placed, is closed at the other end of the shell, sometimes by a single cover, but usually by at least two removable leakproof metal covers stacked one on top of the other.

One known means of preventing leaks is to use O-rings, either of the elastomer type or metallic type, placed in grooves, the geometry of which must be defined very precisely as a function of the characteristics of the seals to be used. Usually, each cover is fitted with two concentric seals that are in contact with a shoulder formed in the shell.

This seal must be inspectable at all times, or even continuously for containers which are placed in a long term storage location after being loaded.

FIG. 1 schematically shows an example of current practice for creating and checking the leaktightness of a container for nuclear material comprising either a single cover (1), or two superposed covers (1) and (2), or three superposed covers (1), (2) and (3).

A first thick cover (1), or primary cover, is used to confine the radioactive material placed in the container cavity (C).

The cover (1) is in contact with a shoulder formed in the thick metal shell (4), generally cylindrically shaped, forming the container body, by means of two concentric seals (11) located in grooves cut in the cover flange (1), and tightened by means of bolts. It includes a service duct (8) between the cavity (C) and the outside, passing through to the upper surface of the cover (1) through a service orifice. This service duct is used to carry out a number of manipulations in the cavity (C), for example adding or removing water, creating a vacuum, inserting or removing a gas such as He, $N_2$, etc.

The cover (1) also includes an inspection duct (5) connecting the space between two seals (11) with the outside, passing through to the upper surface of the cover through an inspection orifice onto which various inspection devices (manometers, qualitative and/or quantitative gas analyzer, for example mass spectrometer, vacuum pump, pressurized gas) can be adapted as will be seen later, in order to check the tightness of the seals.

After use, the service orifice (8) is closed by a closing device (not shown) comprising two concentric seals; an inspection take off point, that can be closed by a plug accessible on the top of the cover, opens up between these two seals in order to check their tightness.

The inspection duct (5) is closed by a plug.

Once the primary cover (1) has been installed and its tightness has been checked, the service orifices closed and their tightness checked, a second safety cover (2) or secondary cover, is placed above the first cover (1), using the same methods. Thus this secondary cover comprises two concentric seals (12) in contact with a shoulder formed in the shell, a service duct (9) and the inspection duct (6) used and closed in the same way as for cover (1).

The service duct (9) is used to control the space between the covers (1) and (2) and the inspection duct (6) is used to check the tightness of the seals (12).

The container is ready after closing the cover and checking its tightness, and closing and checking the tightness of the service orifices, and removing the inspection devices connected to orifices (5) and (6). However, once put into storage it is sometime covered by a thick metallic protective top cap (30) to provide better resistance to crashed aircraft.

The following method may be used to check the tightness of the double seals, for example (11) (12):

i) when the cavity (C) is full of a gas, usually helium at 0.5 bars absolute, a vacuum can be created in the space between the seals (11) at a pressure lower than the pressures on each side of the said seals (for example a few mbars), and the pressure rise (if any) in this space can then be observed and measured through the inspection orifice using a manometer of type (14). This method can measure the leakage rate within a range of about $10^{-5}$ to $10^{-3}$ atm.cm$^3$/sec.

ii) the space between the seals can be overpressurized with respect to the pressures on each side of the said seals (for example 6 bars), and the pressure drop (if any) can also be measured using a manometer type (14). This method is capable of measuring leakage rates within a range of about $10^{-6}$ and $10^{-3}$ atm.cm$^3$/sec.

iii) a helium test can be performed which consists of creating a vacuum in the space between the seals and, when the cavity is filled with helium at pressure P1, measuring the quantity of helium drawn in through a leak in the seal (if any) using a mass spectrometer previously calibrated using a calibrated leak. This method is much more sensitive and can detect leaks of between $10^{-9}$ and $10^{-6}$ atm.cm$^3$/sec.

By using different gases on each side of the seals, it is possible to determine which seal (inside or outside) is leaking.

Thus, when the cover (1) is put into place and after filling the cavity (C) with gas at a pressure P1 less than atmospheric pressure (usually helium at 0.5 bars absolute, as mentioned above), the tightness of the double seals (11) can be tested, and then the tightness of the double seals of the closing device in the service orifice(s) can be tested using the test take off points leading into the space between the seals.

When these verifications have been terminated, the cover (2) is put into position, and the space between the covers (1) and (2) is filled with a gas at pressure P2 usually greater than P1 (typically helium or nitrogen with a working pressure of 6 bars) and checks on the tightness of the various seals can be made as for the cover (1).

The pressure P2 can be continuously monitored using a pressure sensor. If this pressure reduces after long term storage of the container, then there must be a leak either to the atmosphere or into the container cavity (C) since the pressure P2 is significantly higher than the outside atmospheric pressure, and obviously than the lower pressure P1 in cavity (C). It can thus be seen that radioactivity is confined and that it is impossible for this radioactivity to be released from the container cavity to the environment.

In order to take appropriate corrective action, the origin of the leak must be determined by checking the tightness of each of the covers (1) and (2).

The first step in doing this is to remove the protection cover (30) to provide access to the take off point used to check closure of the service orifice (9) and the inspection orifice (6) of the seals (12) to check their tightness.

If it is found that the seal is tight, it is deduced that the leak is located in the primary cover, which for example makes it impossible to remove the cover (2) to eliminate any risk of disseminating radioactivity into the atmosphere.

However, if it is found that there is a leak at one of the previously tested seals, then it remains to be determined if this leak is sufficient to explain the observed pressure drop before concluding that there is no other leak on the cover (1).

When a leak is detected on the primary cover (1) of the container, the solution usually adopted consists of putting a closing cover (3), equipped like covers (1) and (2) with two concentric seals (13) in contact with a shoulder on the shell, with an inspection orifice (7) for checking the tightness of the concentric seals (13) on the cover (3) and a service orifice (10) designed to create a gas pressure P3 between covers (2) and (3), this orifice also being closed by a closure with double inspectable seals.

It can be seen that with this type of device, it is difficult to isolate the location of the leak on the covers with certainty, and particularly to observe a leak on the primary cover directly and consequently to provide an appropriate remedy.

Furthermore, before these inspections can be carried out, the heavy protective top cap (30) has to be removed firstly as already mentioned in order to access the various service or inspection orifice plugs.

Thus, the applicant attempted to search for a device and a process in order to locate any leaks on each of the covers, independently of each other, both on the main seals and on the different working orifice seals while simplifying tightness inspection operations, particularly during storage of the container.

DETAILED DESCRIPTION OF THE PREFERRED EMBODIMENTS

The invention is a device for checking the tightness of covers on a heavy metal container for transport and/or storage of radioactive materials, the said container comprising a cavity for nuclear materials delimited by a thick cylindrical shell closed at one end by means of a bottom fixed so that it is leaktight, and at the other end by at least two thick removable superposed covers, characterized in that the said covers are in contact with a shoulder formed in the shell, through flanges fitted with at least two concentric seals, that at least two ducts pass through the shell at each cover, leading through a first inspection orifice to the outside surface of the shell close to the covers in an accessible location, and through a second orifice, one into the space between the cover concentric seals, and the other into the space between the said cover, the shell and the immediately superposed cover, each inspection orifice optionally being connected to a tightness measurement and inspection circuit.

When the end of the shell closed by the covers is protected by a thick top cap, the accessible point is outside the said closing top cap.

The tightness measurement and inspection circuit comprises essentially a buffer volume connected to measurement and inspection instruments, usually common, such as manometers, vacuum pump, gas analyzer (for example a mass spectrometer), cylinder containing pressurized gas (for example He, $N_2$, Ar) using pipes and a set of valves.

This cover seal tightness inspection device according to the invention comprises mainly ducts passing through the thick container shell and may usefully be complemented by the addition of a service duct passing once again through the shell and leading directly into the cavity.

Note that the ducts leading into the spaces between the covers according to the invention may be used to check the tightness of cover seals working in cooperation with ducts leading into the spaces between the seals, but may also be used as a service duct to control the atmosphere in the space between the covers (nature of gas added, pressure, vacuum).

In order to continue to use the existing installations and equipment for loading containers and checking the tightness of their closure from the top surface of the covers, it is recommended that the inspection and service ducts passing through the covers (as described above and shown on FIGS. 1 as marks 5, 6, 7 and 8, 9, 10 respectively) should be retained, together with their closing devices accessible from the top surface of the said covers.

But in this case, the said service ducts in each cover must be connected through connecting tubes to the inspection duct leading into the space between the seals on the same cover, the said space being connected according to the invention to a tightness inspection duct leading to the outside after passing through the shell, so that the tightness of the service duct closures on the said cover can be checked.

Figure 2:
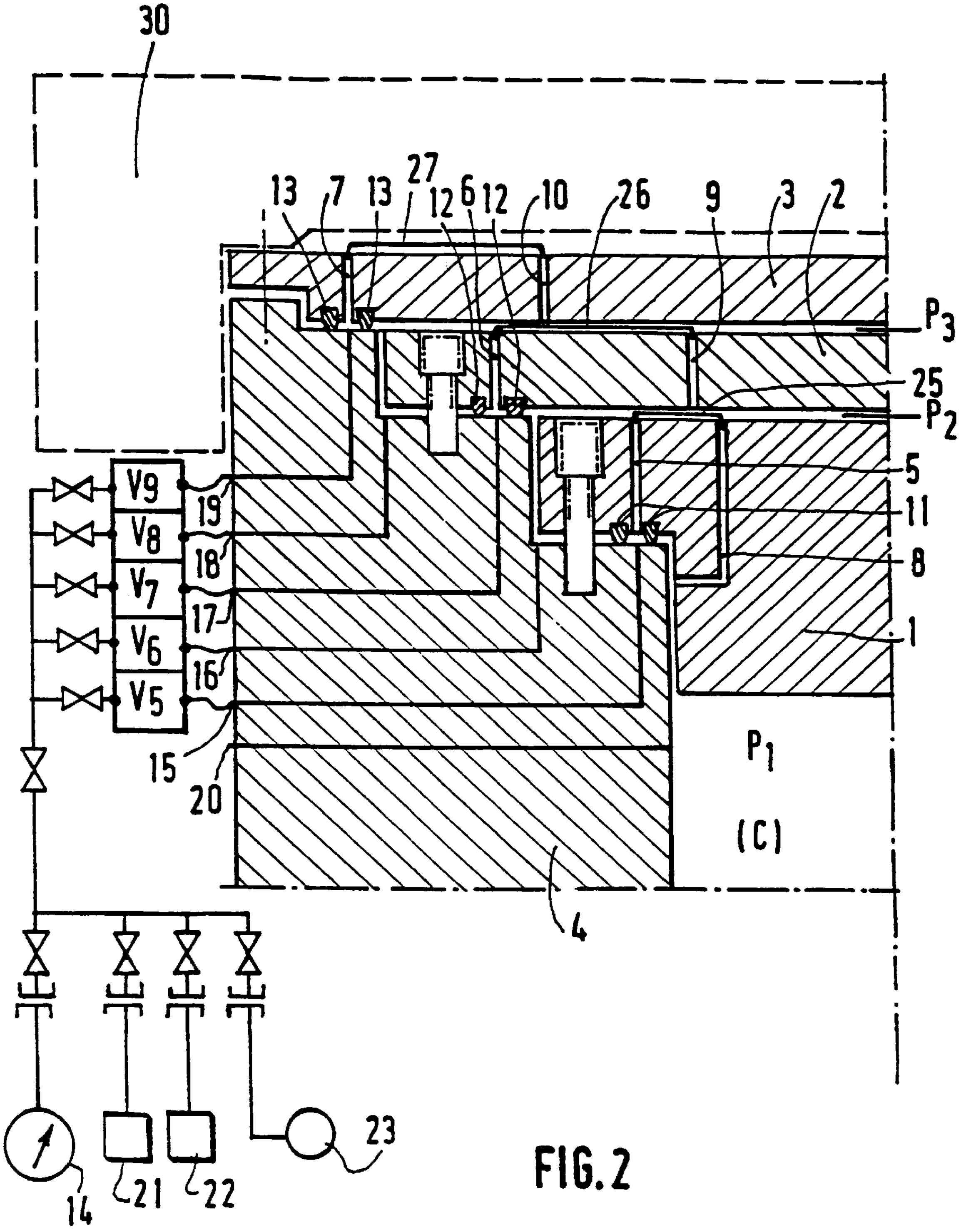
FIG. 2 depicts a device according to the present invention.

FIG. 2 illustrates a container with a cover tightness inspection device according to the invention.

Figure 1:
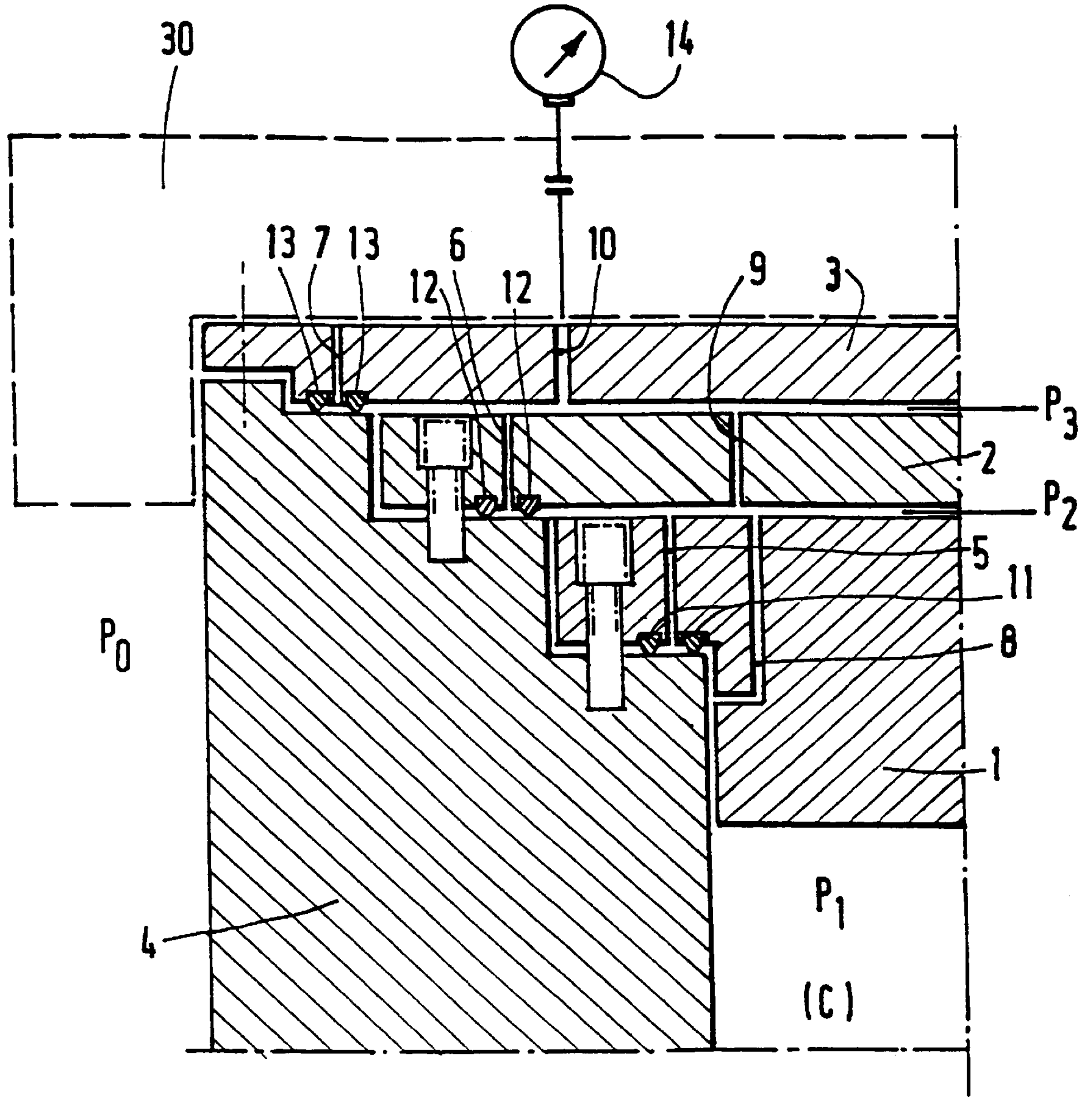
FIG.1 BACKGROUND ART
FIG. 1 depicts a background art device.

The marks have the same meaning as in FIG. 1.

It can be seen that the container includes three covers, the cover (3) being added, as was described above, in the case of a leak in the primary cover (1). Ducts 15, 17 and 19 lead into the space between the concentric seals on covers 1, 2 and 3 respectively, whereas ducts 16, 18 lead into each of the two spaces between the said covers.

Service duct 20 may also be used as an inspection duct, and leads into the cavity in which the radioactive material is located.

The orifices on these ducts 15, 16, 17, 18, 19, 20, located on the outside wall of the shell may be closed conventionally by closing devices (not shown) their tightness, there is a take off point forming a connection from the space between these seals to the outside wall of the shell, which is then closed off by a plug.

The orifice on each of these ducts located on the outside wall of the shell is connected to a buffer volume V5, V6, V7, V8, V9. Each buffer volume is connected through a circuit of pipes and valves to the measurement instruments used to carry out the tightness check: pressure measurement (14), vacuum pump (21), mass spectrometer (22), pressurized He cylinder (23), etc.

Each cover also comprises inspection ducts 5, 6 and 7 leading into spaces between the double seals (11, 12, 13) and service ducts (8, 9, 10) leading into the cavity (C), and into the spaces between covers (P2, P3) inside the circle formed by the concentric seals (11, 12, 13) and into the outside atmosphere.

According to the invention, the inspection take-off points for the double closing seals (not shown) on the service ducts (8, 9, 10) are connected to inspection ducts (5, 6, 7) through connecting tubes (25, 26, 27).

In this case, the procedure for filling the container and closing the various covers and then the protective top cap (30), and checking their tightness at the same time whenever necessary, is the same as the procedure used for the container in FIG. 1.

However, it can be seen that with the device according to the invention, all spaces between seals or covers, or the cavity, are accessible without the need to remove the protective top cap (30) or the covers (2) or (3), thus provides a process that can be used to check the tightness of each cover, including the primary cover (1), and to apply the appropriate corrective action for the position at which the leak (if any) is observed, which was not possible in the past.

One alternative consists of replacing $N_2$ by He once the inside seal (11) has been tested and shown to be tight.

The remedy for a leak detected on the primary cover (1) to prevent any risk of dispersion of radioactivity into the environment, may be to install a third cover (3) and thus transfer the primary barrier initially formed by cover (1) to cover (2).

If no leak is detected after creating a vacuum through (15), a vacuum is created in the space between covers (1) and (2) using duct (16), and after adding helium into the space between seals (12) of cover (2) through duct (17); the spectrometer should then confirm the presence of He.

When the leak has been located on cover (2), and it has been determined that there is no leak on cover (1), then action may be taken on cover (2) without any risk of dissemination, which was not possible before because it was impossible to be certain that there was no leak on the said cover (1) since the seals of this cover were inaccessible.

The same type of procedure may be applied subsequently for the inspection of covers (2) and (3).

The device according to the invention makes it possible to use other processes for detection and localization of leaks.

For example, after filling the space between covers (1) and (2) with He at atmospheric pressure (P2=1 bar), the spaces between the double seals (11) and (12) are pressurized with $N_2$ at the same pressure, for example 6 bars. Any difference that occurs later between the pressures in these spaces between the seals will be a sign of a leak in one of the corresponding double seals. The leak may be quantitatively evaluated by creating a vacuum between the leaking seals, and analyzing the quantity of He drawn in using a mass spectrometer.

Thus, by modifying the nature and pressure of the gases used, the device according to the invention may be used to continuously measure the leakage rate through each of the seals in each cover, including the innermost cover, at any time, from the outside without the need for any disassembly.

What is claimed as new and desired to be secured by Letters Patent of the United States is:

1. A container cover tightness checking apparatus, comprising:

a cylindrical shell, delimiting a cavity for nuclear materials, closed at a bottom end by a fixed leaktight bottom; and at least two removable superposed top end shell covers, the shell covers in contact with a shoulder formed in the shell through flanges fitted with at least two concentric seals, each of the at least two shell covers provided with at least a first duct and a second duct, the first duct leading through a first inspection orifice to an outside surface of the shell close to the shell cover in an accessible location, the first duct further leading into a space between the concentric seals, and the second duct leading through a second inspection orifice to the outside surface of the shell close to the shell cover in an accessible location, the second duct further leading into a space between the cover, the shell, and an immediately superposed cover.

2. The apparatus according to claim 1, further comprising a tightness measurement and inspection circuit connected to each inspection orifice.

3. The apparatus according to claim 1, wherein at least one inspection duct passes through the shell and leads into the cavity.

4. The apparatus according to claim 1, wherein the container has three superposed shell covers.

5. The apparatus according to claim 1, wherein orifices passing through the shell located on the outside surface of the shell for the at least first duct and second duct are closed off by plugs and closing devices with their own seal inspection system.

6. The apparatus according to claim 1, wherein each of the at least two shell covers has at least one of an inspection duct opening up between the concentric seals of the at least two shell covers and a service duct opening up inside the circle formed by the concentric seals, the service duct passing through each of the two shell covers from its upper face to its lower face, and the orifice of the service duct located on the upper surface of the corresponding shell cover being closed off by a closure comprising two seals between which there is a tightness inspection take off point, the take off point closed by a plug.

7. The apparatus according to claim 6, wherein tightness inspection take off points for service duct closures are connected to corresponding inspection ducts.

8. The apparatus according to claim 1, wherein the inspection orifice of at least one of the at least first and second ducts is connected to measurement and inspection instruments.

9. The apparatus according to claim 8, wherein a connection between inspection orifices and measurement and inspection instruments is made through a buffer volume and measurement and inspection instruments are common to several inspection orifices.

10. A container cover tightness checking method, comprising the steps of:

forming a container comprising a cylindrical shell, the shell delimiting a cavity for nuclear materials, closed at an end by a fixedly attached leaktight bottom, and at an other end by at least two removable shell covers, the at least two removable shell covers in contact with a shoulder formed in the shell through flanges fitted with at least two concentric seals; and passing at least a first duct and a second duct through the shell at each of the at least two removable shell covers, the first duct leading through a first inspection orifice to an outside surface of the shell close to the removable shell cover in an accessible location, the first duct further leading into a space between the concentric seals, and the second duct leading through a second inspection orifice to the outside surface of the shell close to the removable shell cover in an accessible location, the second duct further leading into a space between the removable shell cover, the shell, and an immediately superposed removable shell cover.

11. The method according to claim 10, further comprising the step of:

connecting each inspection orifice to a tightness measurement and inspection circuit.

12. The method according to claim 10, further comprising the step of:

passing at least one of the first and second ducts through the shell and into the cavity.

13. The method according to claim 10, wherein the container has three removable shell covers.

14. The method according to claim 10, further comprising the step of:

closing orifices for ducts passing through the shell located on the outside surface of the shell by plugs and closing devices with their own seal inspection system.

15. The method according to claim 10, wherein each of the two shell covers has at least one of an inspection duct opening up between the concentric seals of the covers and a service duct opening up inside the circle formed by the concentric seals, the service duct passing through each of the two shell covers from its upper face to its lower face, and the orifice of the service duct located on the upper surface of the corresponding shell cover being closed off by a closure comprising two seals between which there is a tightness inspection take off point, the take off point closed by a plug.

16. The method according to claim 15, further comprising the step of:

connecting tightness inspection take off points for service duct closures to corresponding inspection ducts.

17. The method according to claim 10, further comprising the step of:

connecting the orifice of at least one of the first and second ducts to measurement and inspection instruments.

18. The method according to claim 17, wherein the connection between the duct orifices and the instruments is made through a buffer volume and the instruments are common to several of the orifices.

19. A container cover tightness checking apparatus, comprising:

containing means for containing nuclear materials within a leakproof cavity;

at least two top end removable superposed shell covering means, each of the two top end removable superposed shell covering means in contact with a shoulder formed in the containing means through flanges fitted with at least two concentric sealing means;

inspecting means for inspecting each shell covering means, the inspecting means comprising at least a first ducting means and a second ducting means;

the first ducting means leading through a first inspection orifice means to an outside surface of the containing means and leading into a space between the cover concentric sealing means; and the second ducting means leading through a second inspection orifice means to the outside surface of the containing means and leading into a space between the shell covering means, the containing means and an immediately superposed shell covering means.

20. The apparatus according to claim 19, further comprising a means for tightness measurement and inspection connected to each inspection orifice means.

21. The apparatus according to claim 19, wherein at least one of the first and second ducting means passes through the containing means and leads into the leakproof cavity.

22. The apparatus according to claim 19, wherein the containing means has three superposed shell covering means.

23. The apparatus according to claim 19, wherein orifices for the first and second ducting means passing through the containing means located on the outside surface of the containing means are closed off by plugging and closing means with their own seal inspection means.

* * * * *